(12) United States Patent
Motoyama et al.

(10) Patent No.: US 6,785,711 B1
(45) Date of Patent: Aug. 31, 2004

(54) METHOD AND SYSTEM FOR DISPLAYING VARIOUS MESSAGES WHILE PERFORMING TASKS OR WHILE IDLING

(75) Inventors: Tetsuro Motoyama, Cupertino, CA (US); Hitoshi Sekine, Sunnyvale, CA (US)

(73) Assignee: Ricoh Co., Ltd., Tokyo (JP)

( * ) Notice: Subject to any disclaimer, the term of this patent is extended or adjusted under 35 U.S.C. 154(b) by 0 days.

(21) Appl. No.: 09/542,284

(22) Filed: Apr. 4, 2000

(51) Int. Cl.$^7$ .............................................. G06F 15/16
(52) U.S. Cl. .................. 709/206; 379/88.11; 379/88.22
(58) Field of Search ................................. 709/204–207, 709/237, 218, 203, 206; 379/884, 88.11, 88.22

(56) References Cited

U.S. PATENT DOCUMENTS

| | | | | |
|---|---|---|---|---|
| 4,794,639 A | * | 12/1988 | Urui et al. ............... | 379/88.19 |
| 5,526,401 A | * | 6/1996 | Roach, Jr. et al. ............ | 379/59 |
| 5,572,643 A | * | 11/1996 | Judson ....................... | 709/218 |
| 5,701,427 A | * | 12/1997 | Lathrop .................. | 395/200.01 |
| 5,801,698 A | * | 9/1998 | Lection et al. .............. | 345/861 |
| 5,908,493 A | | 6/1999 | Krymsky | |
| 5,913,040 A | * | 6/1999 | Rakavy et al. .............. | 709/232 |
| 5,933,485 A | * | 8/1999 | Chang et al. ................ | 379/207 |
| 6,085,196 A | | 7/2000 | Motoyama et al. | |
| 6,161,134 A | * | 12/2000 | Wang et al. ................ | 709/220 |
| 6,208,956 B1 | | 3/2001 | Motoyama | |
| 6,237,039 B1 | * | 5/2001 | Perlman ..................... | 709/237 |
| 6,279,015 B1 | | 8/2001 | Fong et al. | |
| 6,317,789 B1 | * | 11/2001 | Rakavy et al. .............. | 709/224 |

FOREIGN PATENT DOCUMENTS

JP 2-172348 7/1990

OTHER PUBLICATIONS

U.S. patent application Ser. No. 09/542,284, filed Apr. 04, 2000, pending.
U.S. patent application Ser. No. 09/782,164, filed Feb. 14, 2001, pending.
U.S. patent application Ser. No. 09/782,083, filed Feb. 14, 2001, pending.
U.S. patent application Ser. No. 09/782,064, filed Feb. 14, 2001, pending.
U.S. patent application Ser. No. 09/782,187, filed Feb. 14, 2001, pending.
U.S. patent application Ser. No. 09/756,120, filed Jan. 09, 2001, pending.
U.S. patent application Ser. No. 08/738,659, filed Oct. 30, 1996, pending.
U.S. patent application Ser. No. 08/738,461, filed Oct. 30, 1996, pending.
U.S. patent application Ser. No. 08/883,492, filed Jun. 26, 1997, pending.

(List continued on next page.)

*Primary Examiner*—Frantz B. Jean
(74) *Attorney, Agent, or Firm*—Oblon, Spivak, McClelland, Maier & Neustadt, P.C.

(57) ABSTRACT

A method, system and program product for implementing communication to transfer a message for display to a user to a target application unit using an electronic network message or e-mail. A message for display to a user of the application unit may be transferred from, for example, a message center connected to the application unit through a Wide Area Network (WAN) such as the Internet. The message may be displayed on a display window of the application unit when it is determined that a requested task of the application unit will require more than a predetermined amount of time, or the message may be displayed while the application unit is in an idle state.

21 Claims, 15 Drawing Sheets

OTHER PUBLICATIONS

U.S. patent application Ser. No. 09/108,705, filed Jul. 01, 1998, pending.
U.S. patent application Ser. No. 09/107,989, filed Jul. 01, 1998, pending.
U.S. patent application Ser. No. 09/192,583, filed Nov. 17, 1998, pending.
U.S. patent application Ser. No. 09/311,148, filed May 13, 1999, pending.
U.S. patent application Ser. No. 09/408,443, filed Sep. 29, 1999, pending.
U.S. patent application Ser. No. 09/407,769, filed Sep. 29, 1999, pending.
U.S. patent application Ser. No. 09/393,677, filed Sep. 10, 1999, pending.
U.S. patent application Ser. No. 09/440,692, filed Nov. 16, 1999, pending.
U.S. patent application Ser. No. 09/440,646, filed Nov. 16, 1999, pending.
U.S. patent applcaition Ser. No. 09/440,647, filed Nov. 16, 1999, pending.
U.S. patent application Ser. No. 09/440,693, filed Nov. 16, 1999, pending.
U.S. patent application Ser. No. 09/440,645, filed Nov. 16, 1999, pending.
U.S. patent application Ser. No. 09/520,368, filed Mar. 07, 2000, pending.
U.S. patent application Ser. No. 09/542,284, filed Apr. 04, 2000, pending.
U.S. patent application Ser. No. 09/457,669, filed Dec. 09, 1999, pending.
U.S. patent application Ser. No. 09/453,877, filed Feb. 04, 2000, pending.
U.S. patent application Ser. No. 10/167,497, filed Jun. 13, 2002, pending.

* cited by examiner

METHOD AND SYSTEM FOR DISPLAYING VARIOUS MESSAGES WHILE PERFORMING TASKS OR WHILE IDLING

CROSS-REFERENCES TO RELATED APPLICATIONS

The present application is related to U.S. patent application Ser. No. 09/520,368 Attorney Docket No. 5244-0114-2, filed on Mar. 7, 2000, entitled "Method and System for Updating the Device Driver of a Business Office Appliance"; U.S. patent application Ser. No. 09/453,877, filed Feb. 4, 2000, entitled "Method and System for Maintaining a Business Office Appliance through Log Files"; U.S. patent application Ser. No. 09/440,692, filed Nov. 16, 1999, entitled "Method and System to Monitor the Application Usage and Send Back the Information Using Connection and Connectionless Mode"; U.S. patent application Ser. No. 09/440,693, filed Nov. 16, 1999, entitled "Method and System of Remote Diagnostic, Control and Information Collection Using a Dynamic Linked Library"; U.S. patent application Ser. No. 09/440,647, filed Nov. 16, 1999, entitled "Method and System to Monitor the Application Usage and Send Back the Information Using Connection and Connectionless Mode"; U.S. patent application Ser. No. 09/440,646, filed Nov. 16, 1999, entitled "Method and System to Monitor the Application Usage and Send Back the Information Using Connection and Connectionless Mode"; U.S. patent application Ser. No. 09/440,645, filed Nov. 16, 1999, entitled "Application Unit Monitoring and Reporting System and Method With Usage Data Logged Into a Map Structure"; U.S. patent application Ser. No. 09/408,443, filed Sep. 29, 1999, entitled "Method and System for Remote Diagnostic, Control, and Information Collection Based on various Communication Modes for Sending Messages to a Resource Manager"; U.S. patent application Ser. No. 09/407,769, filed Sep. 29, 1999, entitled "Method and System for Remote Diagnostic, Control and Information Collection Based on various Communication Modes for Sending Messages to Users"; U.S. patent application Ser. No. 09/393,677, filed Sep. 10, 1999, entitled "Application Unit Monitoring and Reporting System and Method"; U.S. patent application Ser. No. 09/311,148, filed May 13, 1999, entitled "Application Unit Monitoring and Reporting System and Method"; U.S. patent application Ser. No. 09/192,583, filed Nov. 17, 1998, entitled "Method and System for Communicating With a Device Attached to a Computer Using Electronic Mail Messages"; U.S. patent application Ser. No. 08/883,492, filed Jun. 26, 1997, entitled "Method and System for Diagnosis and Control of Machines Using Connectionless Modes Having Delivery Monitoring and an Alternate Communication Mode"; U.S. patent application Ser. No. 08/820,633, filed Mar. 19, 1997, entitled "Method and System to Diagnose a Business Office Device Based on Operating Parameters Set by a User," now U.S. Pat. No. 5,887,216; U.S. patent application Ser. No. 08/733,134, filed Oct. 16, 1996, entitled "Method and System for Diagnosis and Control of Machines Using Connectionless Modes of Communication," now U.S. Pat. No. 5,909,493; U.S. patent application Ser. No. 08/880,683, filed Jun. 23, 1997, U.S. patent application Ser. Nos. 09/107,989 and 09/108,705, both of which were filed Jul. 1, 1998, all three of which are entitled "Method and System for Controlling and Communicating with Machines Using Multiple Communication Formats," and all three of which are divisions of U.S. patent application Ser. No. 08/624,228, filed Mar. 29, 1996, entitled "Method and System for Controlling and Communicating with Machines Using Multiple Communication Formats," now U.S. Pat. No. 5,818,603; U.S. patent application Ser. No. 09/457,669, entitled "Method and System for Diagnosis and Control of Machines Using Connection and Connectionless Modes of Communication," filed Dec. 9, 1999, which is a continuation of U.S. patent application Ser. No. 08/916,009, entitled "Method and System for Diagnosis and Control of Machines Using Connection and Connectionless Modes of Communication," filed Aug. 21, 1997, which is a continuation of, and U.S. patent application Ser. Nos. 08/738,659 and 08/738,461, filed Oct. 30, 1996, both of which are entitled "Method and System for Diagnosis and Control of Machines Using Connection and Connectionless Modes of Communication," which are divisions of, U.S. patent application Ser. No. 08/463,002, filed Jun. 5, 1995, entitled "Method and System for Diagnosis and Control of Machines Using Connection and Connectionless Modes of Communication", now U.S. Pat. No. 5,819,110; and U.S. patent application Ser. No. 08/852,413, filed May 7, 1987, entitled "Method and System for Controlling and Communicating with Business Office Devices," now U.S. Pat. NO. 5,774,678, which is a continuation of U.S. patent application Ser. No. 08/698,068, filed Aug. 15, 1996, entitled "Method and Apparatus for Controlling and Communicating With Business Office Devices", now U.S. Pat. No. 5,649,120, which is a continuation of U.S. patent application Ser. No. 08/562,192, filed Nov. 22, 1995, now U.S. Pat. No. 5,568,618, entitled "Method and Apparatus for Controlling and Communicating With Business Office Devices", which is a continuation of U.S. patent application Ser. No. 08/473,780, filed Jun. 6, 1995, entitled "Method and Apparatus for Controlling and Communicating With Business Office Devices", now U.S. Pat. No. 5,544,289, which is a continuation of U.S. patent application Ser. No. 08/426,679, filed Apr. 24, 1995, entitled "Method and Apparatus for Controlling and Communicating With Business Office Devices," now U.S. Pat. No. 5,537,554, which is a continuation of U.S. patent application Ser. No. 08/282,168, filed Jul. 28, 1994, entitled "Method and Apparatus for Controlling and Communicating With Business Office Devices", now U.S. Pat. No. 5,412,779, which is a continuation of U.S. patent application Ser. No. 07/902,462, filed Jun. 19, 1992, now abandoned, which is a continuation of U.S. patent application Ser. No. 07/549,278, filed Jul. 6, 1990, now abandoned, the disclosure of each is incorporated herein by reference.

BACKGROUND OF THE INVENTION

1. Field of the Invention

This invention generally relates to the use of an application unit to display various messages for a user while the application is performing tasks or while idling. This invention is further related to configuring a service center or resource administration station to transmit the various messages to the application unit remotely.

2. Discussion of the Background

The cross-referenced applications and patents listed above show various methods to communicate with networked devices and appliances. In particular, a service center can establish communication via either direct communication (e.g., a connectionless (UDP) socket or connection-based (TCP) socket using an information protocol (e.g., an HTTP or FTP), or indirect communication (e.g., a store-and-forward system such as electronic mail (e-mail))).

Application units such as copiers, facsimiles, multi-function image processors, printers and image storage systems have been connected to networks recently. However, when using an application unit, a user may be forced to wait while the application unit performs a requested task. A display device for the application unit may be configured to only display features of the application unit such as tasks which may be requested by the user.

SUMMARY OF THE INVENTION

Accordingly, it is an object of this invention to provide a novel method, system and program product for implementing communication to transmit a message for display to a target application unit using an electronic network message or e-mail.

It is another object of this invention to provide a novel method, system and program product for implementing communication to transmit, using an electronic network message or e-mail to a target application unit, a message for display while the application unit is performing a task or tasks.

It is another object of this invention to provide a novel method, system and program product in which the application unit displays a transmitted message while performing tasks or while idling and waiting for a task request.

These and other objects are accomplished by a novel method, system, and program product in which an electronic network message or e-mail message including a message for display is sent to the target application unit. When a new message is received by the application unit, a storage structure is referenced to determine where the new message is to be stored, and to determine whether an older message may need to be replaced in storage by the new message. When the new message is stored, the storage structure is updated with information indicating the storage location of the newly stored message. When the application unit determines that a requested task will require more than a predetermined minimal time to be completed, or that the application is in an idle state while waiting for a new request for a task to be performed, the application unit displays at least one message on a display unit for viewing by a user.

This invention allows the users of application units to view messages which may be of interest to the users (e.g., news clips, advertising) while waiting for the application units to complete requested tasks, or while the application units are idle. Thus, the users are provided with interesting material for viewing (e.g., the latest news, advertising of current products and services) during periods which otherwise may be wasted time spent waiting, and the provider of the application unit is provided with an opportunity to display advertising of its latest products and services while a user's interest is focused on the displayed message.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
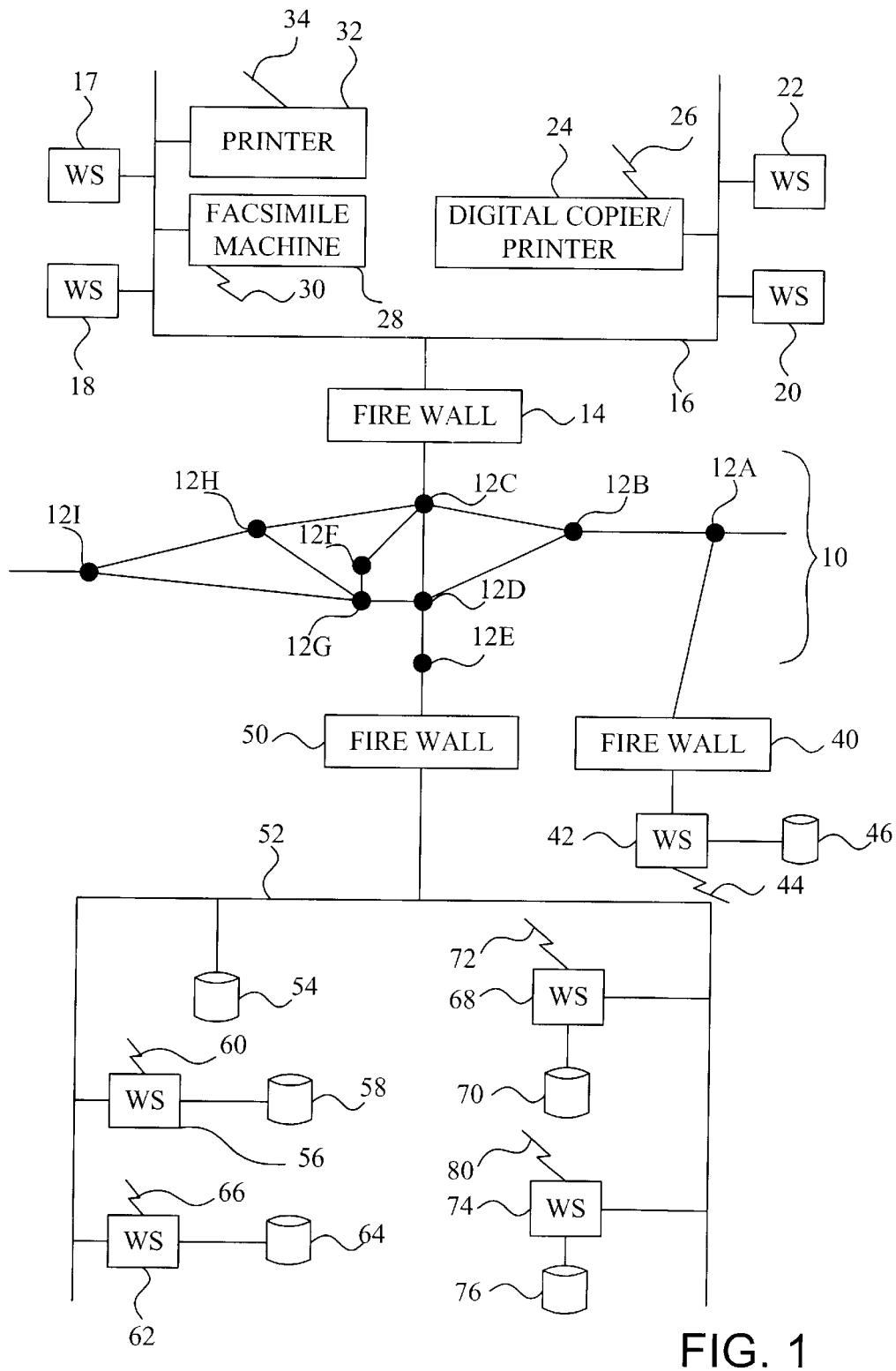
FIG. 1 illustrates three networked business office appliances connected to a network of computers and databases through the Internet.

Referring now to the drawings, wherein like numerals designate identical or corresponding parts throughout the several views, FIG. 1 illustrates (1) various machines and (2) computers for monitoring, diagnosing, controlling and maintaining the operation of the machines or application units. In FIG. 1, there is a first network 16, such as a Local Area Network (LAN) connected to computer workstations 17, 18, 20, and 22. The workstations can be any type of computers including Microsoft Operating System Computers, IBM Personal Computer compatible devices, Unix based computers, or Apple Operating System Computers such as Apple Macintoshes. Also connected to the network 16 are (1) a digital image forming apparatus 24, (2) a facsimile machine 28, and (3) a printer 32. As would be appreciated by one of ordinary skill in the art, two or more of the components of the digital image forming apparatus 24 and the facsimile machine 28 can be combined into a unified "image forming apparatus." The devices 24, 28 and 32 and the workstations 17, 18, 20 and 22 are referred to as machines, application units, business office appliances, or monitored devices, and other types of devices may be used as the machines, application units, business office appliances, or monitored devices, including any of the devices discussed below. Also, a facsimile server (not illustrated) or a thin server (not illustrated), a network scanner (not illustrated) or an image storage system (not illustrated) may be connected to the network 16 and may have a telephone, ISDN (Integrated Services Digital Network), wireless or cable connection. In addition to the digital image forming apparatus 24, facsimile machine 28, and printer 32 being connected to the network 16, these devices may also include conventional telephone and/or ISDN and/or wireless and/or cable connections 26, 30, and 34, respectively. As is explained below, the business office machines, business office appliances or business devices 24, 28, and 32 communicate with a remote monitoring, diagnosis, maintenance and control station, also referred to as a monitoring device, through the Intranet or Internet via the network 16 or by a direct telephone, ISDN, wireless or cable connection.

In FIG. 1, a wide area network (WAN) (e.g., the Internet or its successor) is generally designated by 10. The WAN 10 can either be a private WAN or a public WAN. The WAN 10 includes a plurality of interconnected computers and routers designated by 12A–12I. The manner of communicating over the Internet is known through Request for Comments (RFC) documents obtained from "http://www.ietf.org/rfc.html." TCP/IP (Transmission Control Protocol/Internet Protocol) related communication also is described in "TCP/IP Illustrated, Vol. 1, The Protocols," by Stevens from Addison-Wesley Publishing Company, 1994, which is incorporated herein by reference. Volumes 1–3 of "Internetworking with TCP/IP" by Comer and Stevens are also incorporated herein by reference in their entirety.

In FIG. 1, a firewall 14 is connected between the WAN 10 and the network 16. A firewall is a device or software that allows only authorized computers on one side of the firewall to access a network or other computers on the other side of the firewall. Firewalls are known and commercially available devices and/or software and, for example, include SunScreen from Sun Microsystems Inc. and FireWall-1 from CheckPoint Software Technologies Ltd. Similarly, a firewall 50 is connected between the WAN 10 and a network 52. Also, a firewall 40 is connected between the WAN 10 and a workstation 42.

The network 52 is a conventional network and includes a plurality of workstations 56, 62, 68 and 74. These workstations may be in different departments (e.g., marketing, manufacturing, design engineering and customer service departments) within a single company. In addition to the workstations connected via the network 52, there is a workstation 42 which is not directly connected to the network 52. Information in a database stored in a disk 46 may be shared using proper encryption and protocols over the WAN 10 to the workstations connected directly to the network 52. Also, the workstation 42 includes a direct connection to a telephone line and/or ISDN and/or cable and/or wireless network 44 and the database in disk 46 may be accessed through the telephone line, ISDN, cable or wirelessly. The cable used by this invention may be implemented using a cable which typically is used to carry television programming, a cable which provides for high speed communication of digital data typically used with computers or the like, or any other desired type of cable.

Information of the business office machines/devices/ appliances 24, 28 and 32 may be stored in one or more of the databases stored in the disks 46, 54, 58, 64, 70 and 76. Known databases include (1) SQL databases by Microsoft, Oracle and Sybase (2) other relational databases, and (3) non-relational databases (including object oriented databases). Each of the customer service, marketing, manufacturing, and engineering departments may have their own database or may share one or more databases. Each of the disks used to store databases is a non-volatile memory such as a hard disk or optical disk. Alternatively, the databases may be stored in any storage device including solid state and/or semiconductor memory devices. As an example, disk 64 contains the marketing database, disk 58 contains the manufacturing database, disk 70 contains the engineering database and disk 76 contains the customer service database. Alternatively, the disks 54 and 46 store one or more of the databases, such as service histories, configuration and software information including messages for display, device drivers and firmware, for various business office machines, application units, devices, and appliances.

In addition to the workstations 56, 62, 68, 74 and 42 being connected to the WAN 10, these workstations may also include a connection to a telephone line, ISDN, wireless or cable which provides a direct connection to the machine or application unit being monitored, diagnosed, maintained and/or controlled. Alternatively, these workstations may be connected to the machine or application unit through the WAN 10 with a security encoded secure connection. Additionally, if one communication medium is not operating properly, one of the others can be automatically used for communication.

A feature of the present invention is the use of a "store-and-forward" mode of communication (e.g., Internet e-mail) or transmission or other network communication between a machine or application unit and a computer for diagnosing, maintaining and controlling the machine, and transmitting information regarding the machine state or messages for display. Alternatively, the e-mail which is transmitted may be implemented using a mode of communication that makes direct, end-to-end connections.

Figure 2:
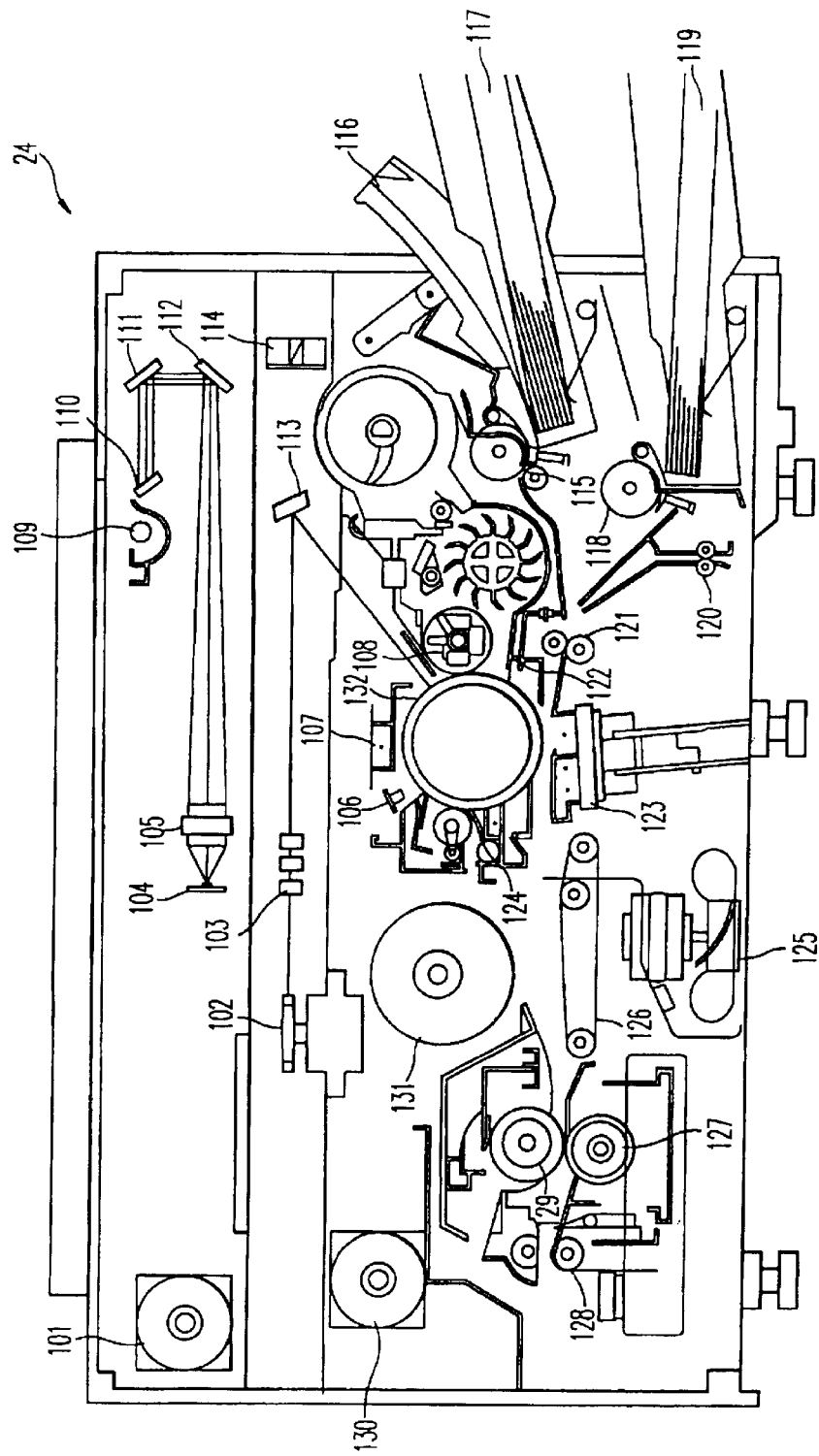
FIG. 2 illustrates the components of a digital image forming apparatus.

FIG. 2 illustrates the mechanical layout of the digital image forming apparatus 24 illustrated in FIG. 1. In FIG. 2, 101 is a fan for the scanner, 102 is a polygon mirror used with a laser printer, and 103 designates an Fθ lens used to collimate light from a laser (not illustrated). Reference numeral 104 designates a sensor for detecting light from the scanner, 105 is a lens for focusing light from the scanner onto the sensor 104, and 106 is a quenching lamp used to erase images on the photoconductive drum 132. There is a charging corona unit 107 and a developing roller 108. Reference numeral 109 designates a lamp used to illuminate a document to be scanned and 110, 111 and 112 designate mirrors used to reflect light onto the sensor 104. There is a drum mirror 113 used to reflect light to the photoconductive drum 132 originating from the polygon mirror 102. Reference number 114 designates a fan used to cool the charging area of the digital image forming apparatus, and 115 is a first paper feed roller used for feeding paper from the first paper cassette 117, and 116 is a manual feed table. Similarly, 118 is a second paper feed roller for the second cassette 119. Reference numeral 120 designates a relay roller, 121 is a registration roller, 122 is an image density sensor and 123 is a transfer/separation corona unit. Reference numeral 124 is a cleaning unit, 125 is a vacuum fan, 126 illustrates a transport belt, 127 is a pressure roller, and 128 is an exit roller. Reference numeral 129 is a hot roller used to fix toner onto the paper, 130 is an exhaust fan and 131 is the main motor used to drive the digital image forming apparatus.

Figure 3:
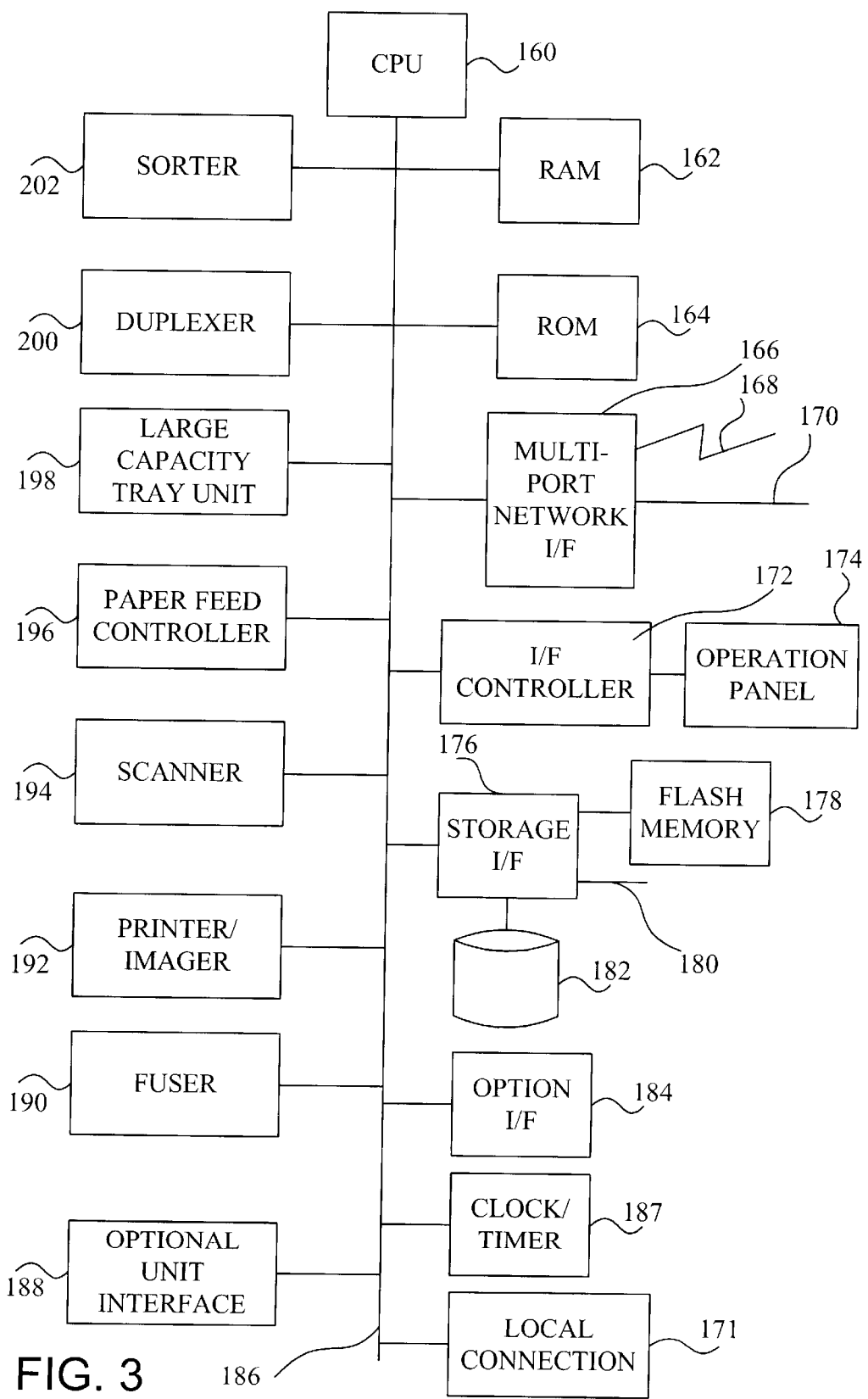
FIG. 3 illustrates the electronic components of the digital image forming apparatus illustrated in FIG. 2.

FIG. 3 illustrates a block diagram of the electronic components illustrated in FIG. 2. The CPU 160 is a microprocessor and acts as the system controller. Random access memory (RAM) 162 stores dynamically changing information including operating parameters of the digital image forming apparatus. A non-volatile memory (e.g., a read only memory (ROM) 164) stores the program code used to run the digital image forming apparatus and also information describing the digital image forming apparatus (static-state data) such as model number, serial number, installed ROM version, manufacturing lot number of the digital image forming apparatus and default parameters.

There is a multi-port network interface 166 which allows the digital image forming apparatus to communicate with external devices. Reference numeral 168 represents a telephone, ISDN, or cable line and 170 represents a LAN. Further information of the multi-port network interface is described in respect to FIG. 4. A local connection 171 includes one or more connections such as SCSI, IEEE 1394, USB, Centronics and RS232 to communicate with a host computer that is directly connected to the business office appliance or application unit. An interface controller 172 is used to connect an operation panel 174 to a system bus 186. The operation panel 174 includes standard input and output devices found on a digital image forming apparatus including, for example, a copy button, keys to control the operation of the digital image forming apparatus such as number of copies, reducement/enlargement, darkness/lightness, etc. Additionally, a liquid crystal display may be included within the operation panel 174 to display parameters, and messages of the digital image forming apparatus, or other messages of interest to a user. Alternatively, the touch panel may be used for the display and keys. The display of messages in the digitial image forming apparatus may be controlled by, for example, the CPU 160 and the interface controller 172, which may include a graphic controller chip.

A storage interface 176 connects storage devices to the system bus 186. The storage devices include a flash memory 178 which can be substituted by a conventional EEPROM and a disk 182. The disk 182 includes a hard disk, optical disk, and/or a floppy disk drive. There is a connection 180 connected to the storage interface 176 which allows for additional memory devices to be connected to the digital image forming apparatus. The flash memory 178 is used to store semi-static state data which describes parameters of the digital image forming apparatus which infrequently change over the life of the digital image forming apparatus. Such parameters include the options and configuration of the digital image forming apparatus. The flash memory 178 also may contain a portion of software that can be updated in the future through the network connection or other mechanism. Messages for display may be stored in semi-static or dynamic storage, for example, in the flash memory 178 or in a hard disk included in disk 182. An option interface 184 allows additional hardware such as a PC card to be connected to the digital image forming apparatus. A clock/timer 187 is utilized to keep track of both the time and date and also to measure elapsed time.

On the left side of FIG. 3, the various sections making up the digital image forming apparatus are illustrated. Reference numeral 202 designates a sorter and contains sensors and actuators used to sort the output of the digital image forming apparatus. There is a duplexer 200 which allows a duplex operation to be performed by the digital image forming apparatus and includes conventional sensors and actuators. The digital image forming apparatus includes a large capacity tray unit 198 which allows paper trays holding a large number of sheets to be used with the digital image forming apparatus. The large capacity tray unit 198 includes conventional sensors and actuators.

A paper feed controller 196 is used to control the operation of feeding paper into and through the digital image forming apparatus. A scanner 194 is used to scan images into the digital image forming apparatus and includes conventional scanning elements such as a light, mirror, etc. Additionally, scanner sensors are used such as a home position sensor to determine that the scanner is in the home position, and a lamp thermistor is used to ensure proper operation of the scanning lamp. There is a printer/imager 192 which prints the output of the digital image forming apparatus and includes a conventional laser printing mechanism, a toner sensor, and an image density sensor. A fuser 190 is used to fuse the toner onto the page using a high temperature roller and includes an exit sensor, a thermistor to assure that the fuser 190 is not overheating, and an oil sensor. Additionally, there is an optional unit interface 188 used to connect to optional elements of the digital image forming apparatus such as an automatic document feeder, a different type of sorter/collator, or other elements which can be added to the digital image forming apparatus.

Figure 4:
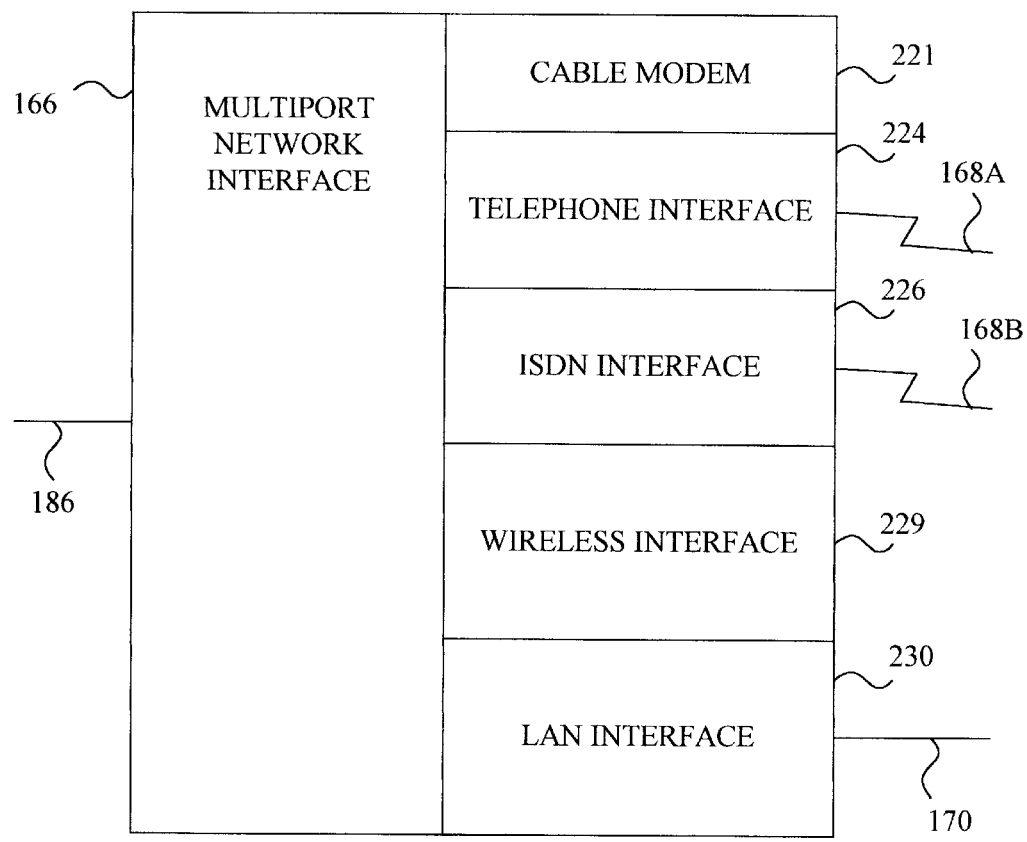
FIG. 4 illustrates details of a multi-port network interface illustrated in FIG. 3.

FIG. 4 illustrates details of the multi-port network interface 166 described previously with regard to FIG. 3. The digital image forming apparatus may communicate with external devices through a Cable Modem 221 which has a high speed connection over cable, a conventional telephone interface 224 which connects to a phone line 168A, an ISDN interface 226 which connects to an ISDN line 168B, a Wireless Interface 229 which connects to the WAN, and a LAN interface 230 which connects to a LAN 170. Other interfaces (not shown) include, but are not limited to, Firewire and Digital Subscriber Line (DSL) (original DSL, concentric DSL, and asymmetric DSL). FireWire (IEEE 1394) is described in Wickelgren, I., "The Facts About "FireWire", IEEE Spectrum, April 1997, Vol. 34, Number 4, pp. 19–25, the contents of which are incorporated herein by reference. Preferably, communication utilizes a "reliable" protocol with error detection and retransmission. Examples of such a protocol include Reliable Datagram Protocol (RDP) and Transmission Control Protocol (TCP). A single device which connects to both a Local Area Network and a telephone line is commercially available from Megahertz and is known as the Ethernet-Modem. An actual interface may incorporate one or more interfaces described herein.

The CPU or other microprocessor or circuitry executes a monitoring process to monitor the state of each of the sensors of the digital image forming apparatus, and a sequencing process is used to execute the instructions of the code used to control and operate the digital image forming apparatus. Additionally, there is a central system control process executing to control the overall operation of the digital image forming apparatus and a communication process used to assure reliable communication to external devices connected to the digital image forming apparatus. The system control process monitors and controls data storage in a static state memory such as ROM 164 of FIG. 3, a semi-static memory such as the flash memory 178 or disk 182, or the dynamic state data which is stored in a volatile or non-volatile memory such as the RAM 162 or the flash memory 178 or disk 182. Additionally, the static state data may be stored in a device other than the ROM 164 such as a non-volatile memory including either the flash memory 178 or disk 182.

The above details have been described with respect to a digital image forming apparatus but the present invention is equally applicable to other business office machines, application units, devices or appliances such as an analog copier, a facsimile machine, a scanner, a printer, a facsimile server, or an appliance with which a user interfaces (e.g., a microwave oven, VCR, TV, refrigerator, digital camera, cellular phone, palm top computer). Additionally, the present invention includes other types of machines, application units, appliances or devices which operate using some communication method (e.g., store-and-forward or direct connection-based communication) to contact the remote device or computer, such as a metering system including a gas, water, or electricity metering system, household appliance, vending machines, or any other mechanical device (e.g., automobiles) that need to be monitored during operation or remote diagnosis. In addition to monitoring special purpose machines and computers, the invention can be used to monitor, control, and diagnose a general purpose computer which would be the monitored and/or controlled device, and information regarding resource usage by an end user or messages indicating information of interest to the user (e.g., news, advertising) may be communicated to a remote monitoring device and to the end user from a remote monitoring device.

Figure 5:
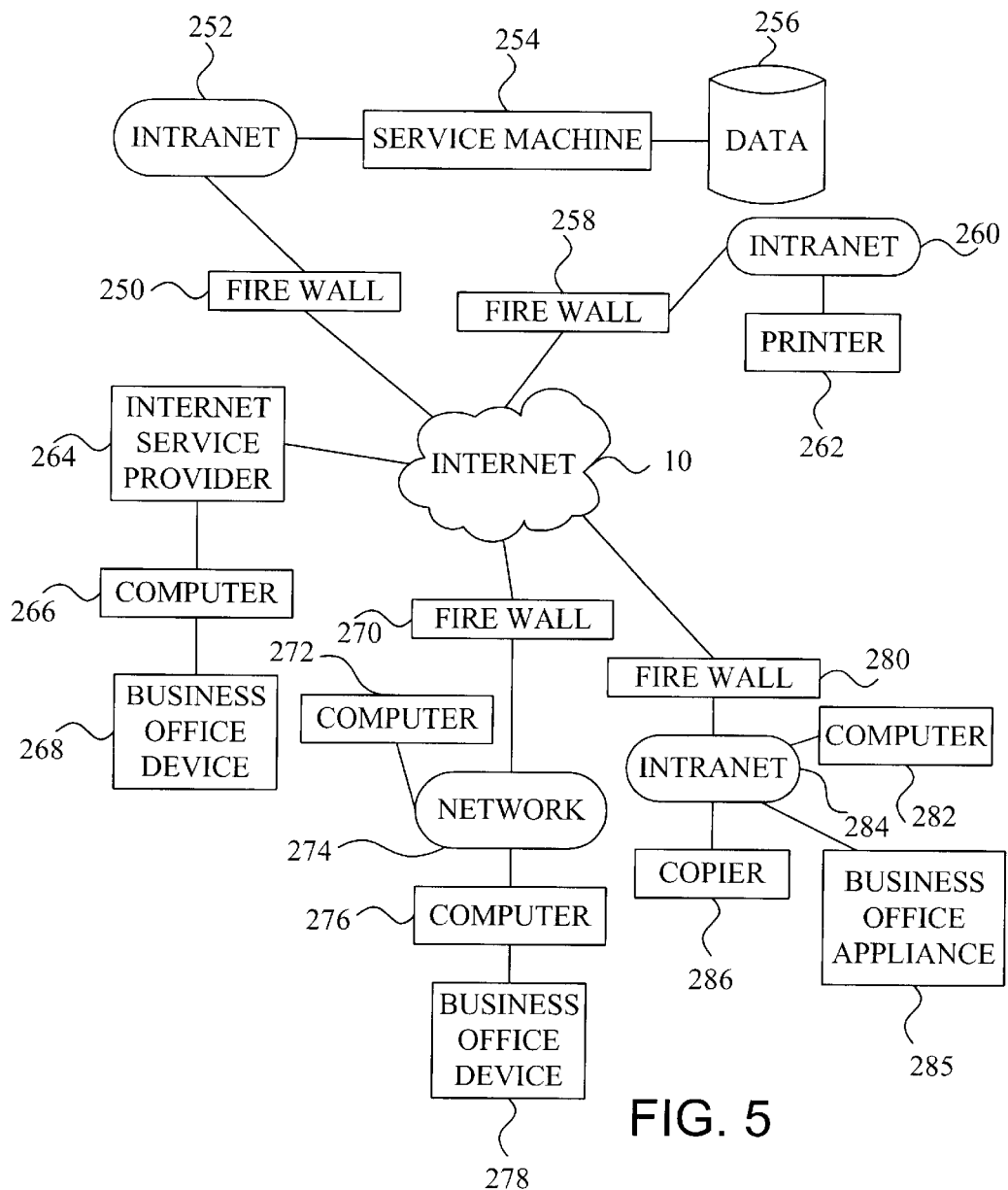
FIG. 5 illustrates an alternative system configuration in which business office appliances are either connected directly to the network or connected to a computer which is connected to the network.

FIG. 5 illustrates an alternative system diagram of the invention in which different devices and subsystems are connected to the WAN 10. However, there is no requirement to have each of these devices or subsystems as part of the invention. Each component or subsystem illustrated in FIG. 5 is individually part of the invention. Further, the elements illustrated in FIG. 1 may be connected to the WAN 10 which is illustrated in FIG. 5. In FIG. 5, there is illustrated a firewall 250 connected to an Intranet 252. The service machine 254 connected to the Intranet 252 includes therein or has connected thereto data 256 which may be stored in a database format. The data 256 includes configuration, service history, historical usage, performance, malfunction, resource usage information for particular devices or users of the devices, and any other information including statistical information of the operation or failure or set-up and components or optional equipment of which are being monitored. The service machine 254 may be implemented as the device or computer which transmits messages of interest for a user to the application unit or which requests the monitored devices to transmit data or which requests that remote control and/or diagnosis tests be performed on the monitored devices, and which transmits information to the specified destinations including the monitored devices, computers or one or more persons. The service machine 254 may be implemented as any type of device and is preferably implemented using a computerized device such as a general purpose computer.

Another subsystem of FIG. 5 includes a firewall 258, an Intranet 260, and a printer 262 connected thereto. In this subsystem, the functions of sending and receiving electronic messages by the printer 262 (and similarly by a copier 286) are performed by circuitry, a microprocessor, or any other type of hardware contained within or mounted on the printer 262 (i.e., without using a separate general purpose computer). The electronic message includes e-mail messages and any other form of message through the network based upon various protocols such as SMTP (SIMPLE MAIL TRANSFER PROTOCOL) (RFC 821), FTP (FILE TRANSFER PROTOCOL) (RFC 959) and Hypertext Transfer Protocol—HTTP/1.1 (RFC 2616).

An alternate type of subsystem includes the use of an Internet service provider 264 which may be any type of Internet service provider (ISP), including known commercial companies such as America Online, AT&T, CompuServe, NiftyServe, Microsoft, the Internet service provider Erols or any other Internet service provider. In this subsystem, a computer 266 is connected to the ISP 264 through any communication means including a modem (e.g., a telephone line modem, a cable modem, modems which uses any type of wires such as modems used over an ISDN (Integrated Services Digital Network) line, ADSL (Asymmetric Digital Subscriber Line), DSL (Digital Subscriber Line), modems which use frame relay communication, ATM (Asynchronous Transfer Mode), wireless modems, a fiber optic modem, any digital or analog modem, or a device which uses infrared light waves). Further, a business office device 268 is connected to the computer 266. As an alternative to the business office device 268 (and any other device illustrated in FIG. 5), a different type of machine may be monitored or controlled such as a digital copier, any type of application unit, any type of appliance, security system, or utility meter such as an electrical, water, or gas utility meter, or any other device discussed herein.

Also illustrated in FIG. 5 is a firewall 270 connected to a network 274. The network 274 may be implemented as any type of computer network (e.g., an Ethernet network or token-ring network). Networking software which may be used to control the network includes any desired networking software including free software such as Linux and software commercially available from Novell or Microsoft. The network 274 may be implemented as an Intranet, if desired. A computer 272 connected to the network 274 may be used as a monitoring device to control, to maintain, to obtain information from a business office device 278 and to generate reports such as reports showing problems which occurred in various machines connected to the network and usage reports of the devices connected to the network 274. In this embodiment, a computer 276 is connected between the business office device 278 and the network 274. The business office device 278 is a local device for the computer 276. This computer receives e-mail or any other form of communications from the network and forwards the appropriate commands or data, including informational messages for display to users, or any other information to the business office device 278. While it has been stated that the business office device 278 is connected to the computer 276 as a local device, there is no requirement for a wired connection between the business office device 278 and the computer 276. Communication between the business office device 278 and the computer 276 may be accomplished using wire-based or wireless methods including, but not limited to radio frequency connections, electrical connections and light connections (e.g., an infrared connection, or a fiber optics connection). Similarly, each of the various networks and intranets illustrated in FIG. 5 may be established using any desired manner including through the establishment of wireless networks such as radio frequency networks. The wireless communication described herein may be established using spread spectrum techniques including techniques which use a spreading code and frequency hopping techniques such as the frequency hopping wireless technique which is disclosed in the Bluetooth Specification (available at the World Wide Web site "http://www.bluetooth.com"), which is incorporated herein by reference.

Another subsystem illustrated in FIG. 5 includes a firewall 280, an Intranet 284, a computer 282 connected thereto, a copier 286 and a business office appliance 285. The computer 282 may be used to generate reports and request diagnostic or control procedures. These diagnostic and control procedures may be performed with respect to the copier 286 or business office appliance 285 or any of the other devices illustrated in or used with FIG. 5. While FIG. 5 illustrates a plurality of firewalls, the firewalls are preferable but optional equipment and therefore the invention may be operated without the use of firewalls, if desired. Although Service Machine 254 is on the separate Intranet 252, any computer within Intranet 260, 274, or 284 can function as the Service Machine to maintain the business office devices/ appliances or application units. For example, a very large company may want to keep its own service machine while a small company may use an outside service.

Figure 6A:
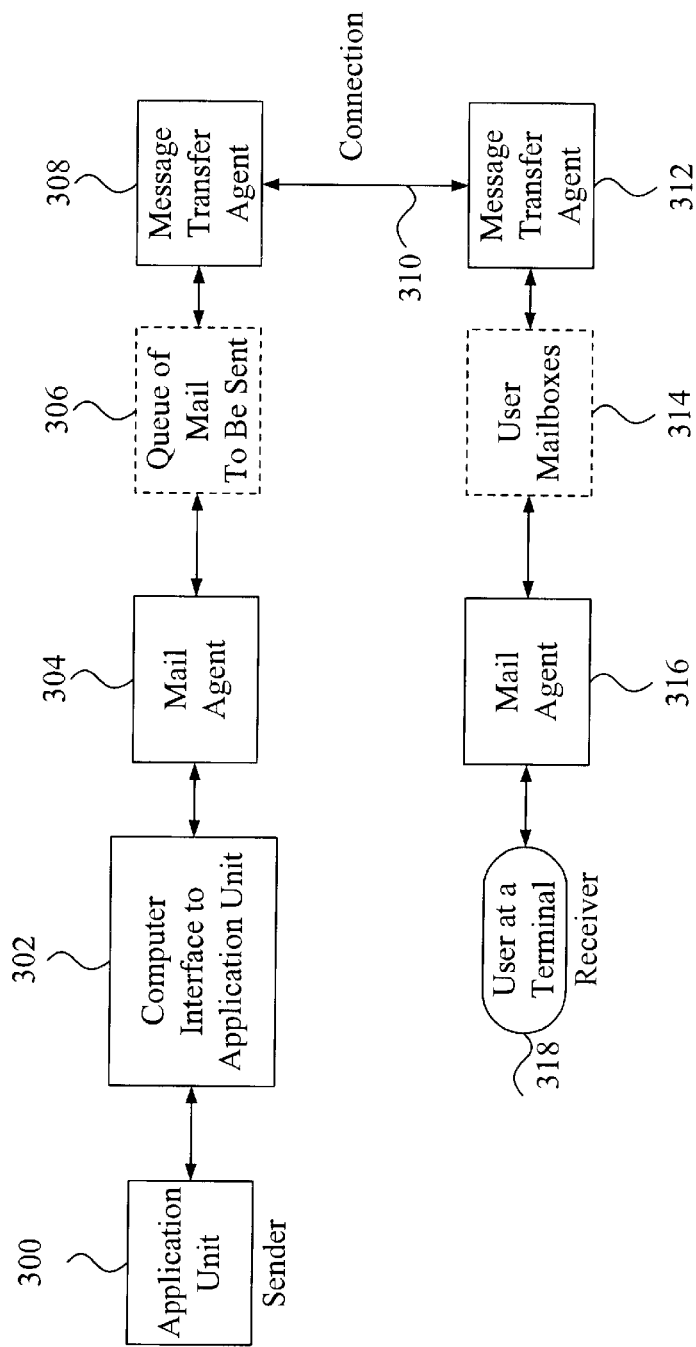
FIG. 6A illustrates in block diagram format the flow of information to and from an application unit using electronic mail.

FIG. 6A illustrates an application unit 300 connected to a typical e-mail exchange system which includes components 302, 304, 306, 308, 310, 312, 314, 316 and 318 which may be implemented in a conventional manner and are taken from FIG. 28.1 of Stevens, as discussed previously. The application unit 300 may be any of the devices described herein and the computer interface 302 may interface any application unit 300 to computers, such as computer 276 illustrated in FIG. 5. While FIG. 6A illustrates the application unit 300 as being a sender, the sending and receiving function may be reversed in FIG. 6A. Furthermore, if desired, the computer interface may not be needed to interface with the application unit 300 at all. The computer interface 302 then interacts with a mail agent 304. Popular mail agents for Unix include MH, Berkeley Mail, Elm, and Mush. Mail agents for the Windows family of operating systems include Microsoft Outlook and Microsoft Outlook Express. At the request of the computer interface 302, the mail agent 304 creates e-mail messages to be sent and, if desired, places these messages to be sent in a queue 306. The mail to be sent is forwarded to a Message Transfer Agent (MTA) 308. A common MTA for Unix systems is Sendmail. Typically, the message transfer agents 308 and 312 exchange communication using a TCP (Transfer Control Protocol) connection or a TCP/IP (Internet Protocol) connection. Notably, the communication between the message transfer agents 308 and 312 may occur over any size network (e.g., WAN or LAN). Further, the message transfer agents 308 and 312 may utilize any communication protocol.

From the message transfer agent 312, e-mail messages are stored in user mailboxes 314 which are transferred to the mail agent 316 and ultimately transmitted to the user at a terminal 318 which functions as a receiving terminal.

This "store-and-forward" process avoids the sending mail agent 304 from having to wait until establishment of the direct connection with the mail. Because of network delays, the communication could take a substantial amount of time during which the application would be unresponsive. Such an unresponsiveness is generally unacceptable to users of the application unit. By using e-mail as the store-and-forward process, retransmission attempts after failures occur automatically for a fixed period of time (e.g., three days). In an alternate embodiment, the application controlling the user interface can avoid waiting by passing communication requests to one or more separate threads. Those threads can then control communication with the receiving terminal 318 while the application begins responding to the user interface again. In yet another embodiment in which a user wishes to have communication completed before continuing, direct communication with the receiving terminal is used. Such direct communication can utilize any protocol not blocked by a firewall between the sending and receiving terminals. Examples of such protocols include HTTP and FTP.

Public WANs, such as the Internet, are not considered to be secure. Therefore, messages transmitted over the public WANs (and multi-company private WANs) should be encrypted to keep the messages confidential. Encryption mechanisms are known and commercially available which may be used with the present invention. For example, a C library function, crypt( ), is available from Sun Microsystems for use with the Unix operating system. Other encryption and decryption software packages are known and commercially available and may also be used with this invention. One such package is PGP (Pretty Good Privacy) Virtual Private Network (VPN) available from Network Associates. Other VPN software is available, for example, from Microsoft Corporation.

Figure 6B:
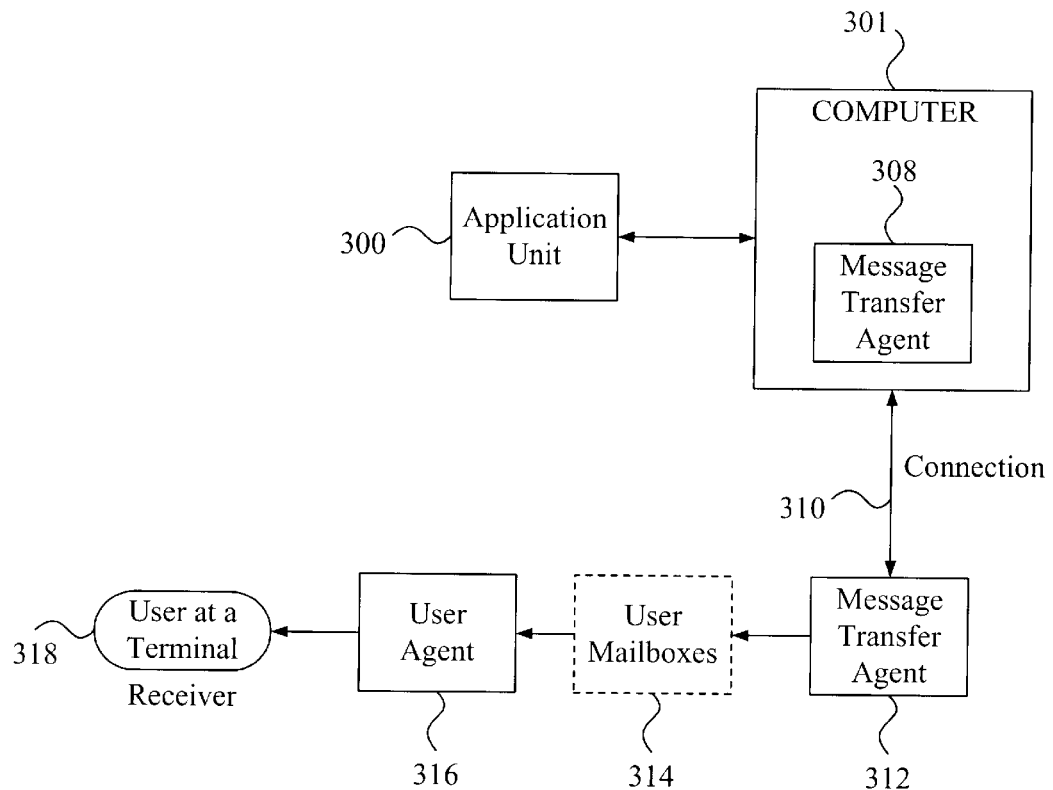
FIG. 6B illustrates an alternative way of communicating using electronic mail in which the computer which is connected to the application unit also serves as a message transfer agent.

As an alternative to the general structure of FIG. 6A, a single computer may be used which functions as the user terminal, and also the message transfer agent. As illustrated in FIG. 6B, the application unit 300 is connected to a computer 301 which includes the message transfer agent 308. If desired, the other components of the sending side of FIG. 6A may be included in the computer 301 of FIG. 6B including the mail agent 304 and the queue of mail to be sent 306.

Figure 6C:
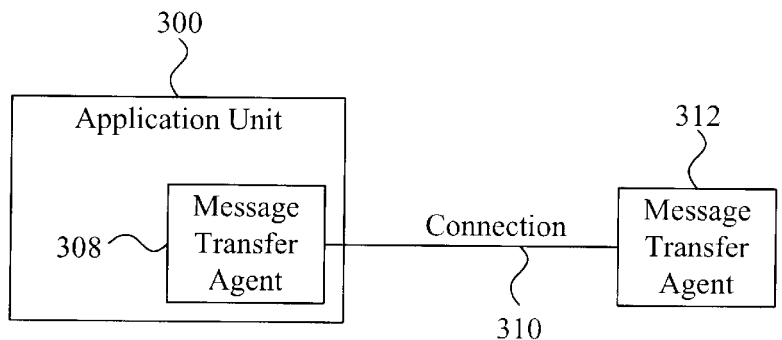
FIG. 6C illustrates an alternative way of communicating using electronic mail in which the application unit includes a message transfer agent.

A further alternative structure is shown in FIG. 6C in which the message transfer agent 308 is formed as part of the application unit 300. Further, the message transfer agent 308 is connected to the message transfer agent 312 by the connection 310. In the embodiment of FIG. 6C, the application unit 300 is directly connected to the connection 310 and has an e-mail capability. One use of the embodiment of FIG. 6C includes using a facsimile machine with an e-mail capability (defined in RFC 2305 (a simple mode of facsimile using Internet mail)) as the application unit 300.

Figure 7:
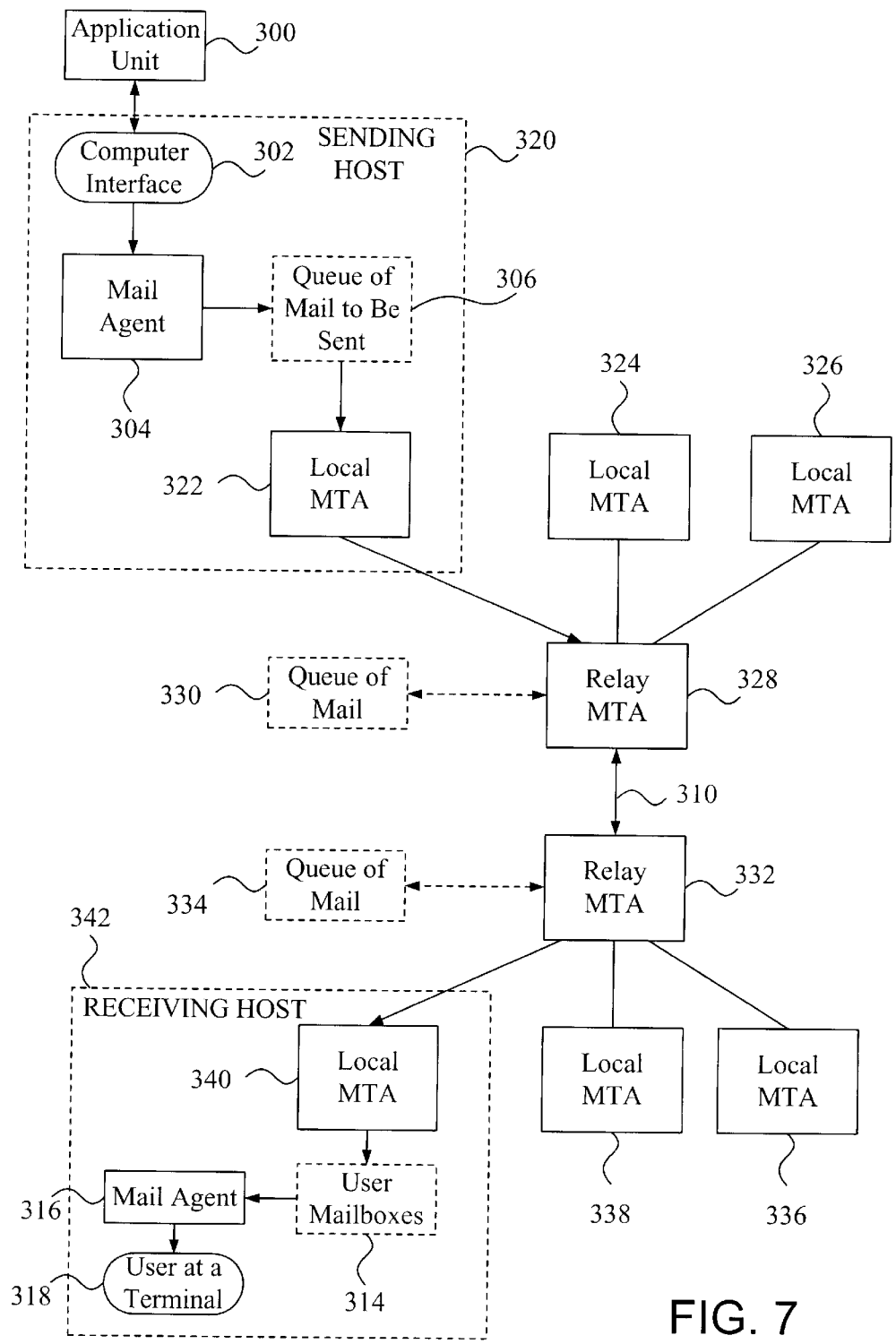
FIG. 7 illustrates an alternative manner of sending messages across the Internet.

FIG. 7 illustrates an alternative implementation of transferring mail and is based on FIG. 28.3 of Stevens. FIG. 7 illustrates an electronic mail system having a relay system at each end. The arrangement of FIG. 7 allows one system at an organization to act as a mail hub. In FIG. 7, there are four MTAs connected between the mail agent 304 and the mail agent 316. These MTAs include local MTA 322, relay MTA 328, relay MTA 332, and local MTA 340. The most common protocol used for mail messages is SMTP (Simple Mail Transfer Protocol) (RFC 821) which may be used with this invention, although any desired mail protocol may be utilized. In FIG. 7, 320 designates a sending host which includes the computer interface 302, the mail agent 304, and the local MTA 322. The application unit 300 is connected to, or alternatively included within, the sending host 320. As another case, the application unit 300 and host 320 can be in one machine where the host capability is built into the application unit 300. Other local MTAs include local MTA 324 and 326. Mail to be transmitted and received may be queued in a queue of mail 330 of the relay MTA 328. The messages are transferred across the connection 310, which may be, for example, the Internet, or may be any other type of network or connection.

The transmitted messages are received by the relay MTA 332 and if desired, stored in a queue of mail 334. The mail is then forwarded to the local MTA 340 of a receiving host 342. The mail may be placed in one or more of the user mailboxes 314 and subsequently forwarded to the mail agent 316 and finally forwarded to the user at a terminal 318. If desired, the mail may be directly forwarded to the terminal without user interaction. Other local MTAs at the receiving side include local MTA 338 and local MTA 336 which may have their own mailboxes, mail agents, and terminals.

FIGS. 6A–6C and 7 show the message transfer from the application unit 300 to the remote terminals, such as 342. The messages can also flow from the remote terminals to the application unit 300 in the reverse direction using the same mail protocol such as SMTP.

Figure 8:
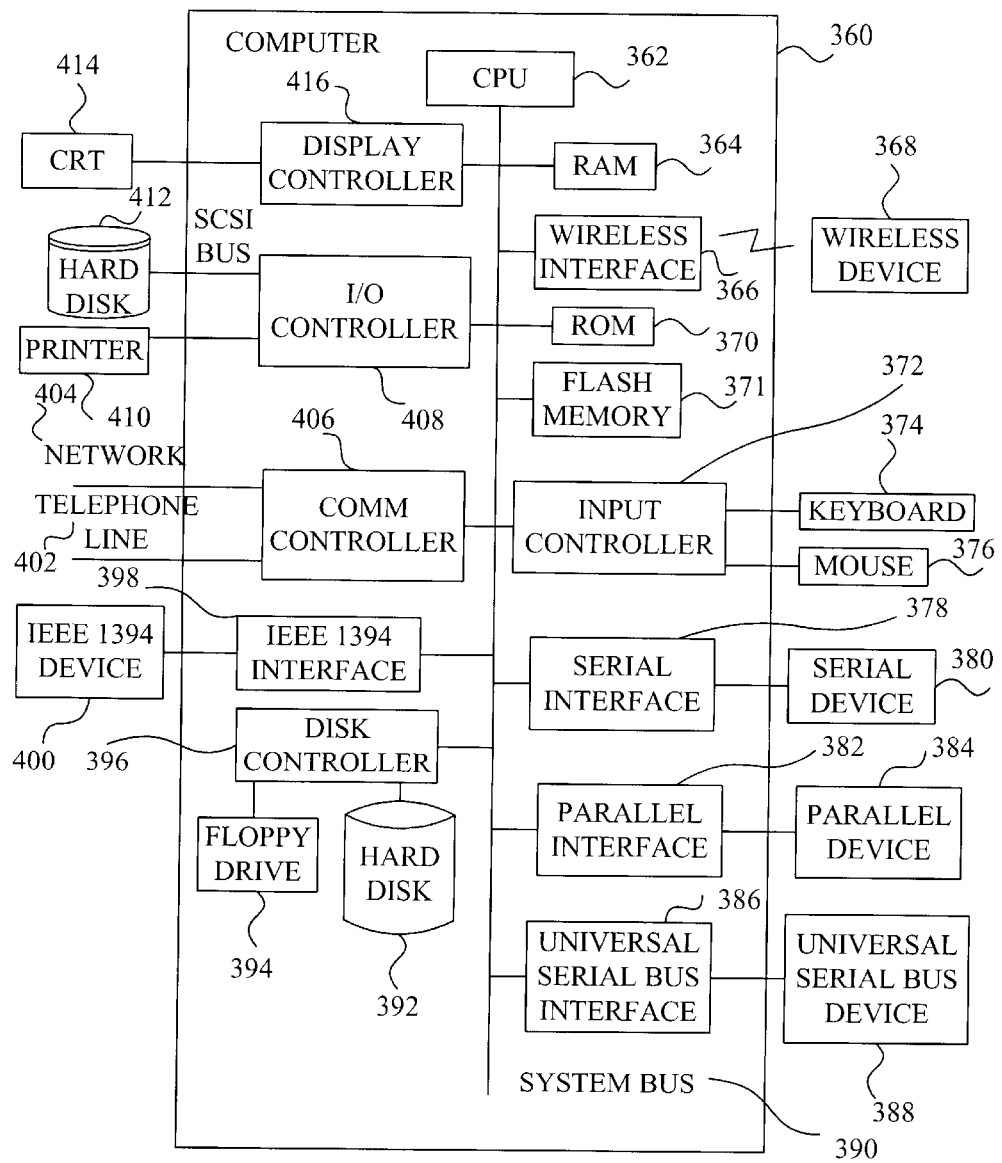
FIG. 8 illustrates an exemplary computer which may be connected to the application unit and used to communicate with the application unit.

The various computers utilized by the present invention, including the computers 266 and 276 of FIG. 5, may be implemented as illustrated in FIG. 8. Further, any other computer utilized by this invention may be implemented in a similar manner to the computer illustrated in FIG. 8, if desired, including the service machine 254, computer 272, and computer 282 of FIG. 5. However, not every element illustrated in FIG. 8 is required in each of these computers. In addition, some business office appliances, such as a thin server, may be implemented in a similar manner to the computer illustrated in FIG. 8. In FIG. 8, the computer 360 includes a CPU 362 which may be implemented as any type of processor including commercially available microprocessors from companies such as Intel, AMD, Motorola, Hitachi and NEC. There is a working memory such as a RAM 364, and a wireless interface 366 which communicates with a wireless device 368. The communication between the interface 366 and device 368 may use any wireless medium (e.g., radio waves, or light waves). The radio waves may be implemented using a spread spectrum technique such as Code Division Multiple Access (CDMA) communication or using a frequency hopping technique such as that disclosed in the Bluetooth specification.

There is a ROM 370, and a flash memory 371, although any other type of nonvolatile memory may be utilized in addition to or in place of the flash memory 371 such as an EEPROM, for example. An input controller 372 has connected thereto a keyboard 374 and a mouse 376. There is a serial interface 378 connected to a serial device 380. Additionally, a parallel interface 382 is connected to a parallel device 384, a universal serial bus interface 386 is connected to a universal serial bus device 388, and also there is an IEEE 1394 device 400, commonly referred to as a fire wire device, connected to an IEEE 1394 interface 398. The various elements of the computer 360 are connected by a system bus 390. A disk controller 396 is connected to a floppy disk drive 394 and a hard disk drive 392. A communication controller 406 allows the computer 360 to communicate with other computers and application units (e.g., by sending e-mail messages) over a telephone line 402 or a network 404. An I/O (Input/Output) controller 408 is connected to a printer 410 and a hard disk 412, for example using a SCSI (Small Computer System Interface) bus. There is also a display controller 416 connected to a CRT (Cathode Ray Tube) 414, although any other type of display may be used including a liquid crystal display, a light emitting diode display, a plasma display, etc.

Figure 9:
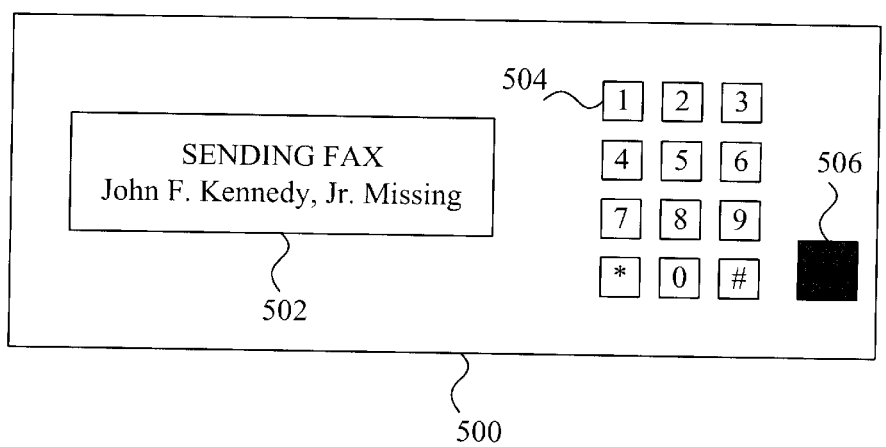
FIG. 9 illustrates an exemplary operation panel for an application unit having a character display capability.

FIG. 9 illustrates an exemplary operation panel 500 for an application unit having a character display capability. A keypad 504 is provided for a user to enter numeric data. A button 506 is provided for user control. A message display window 502 is provided to display messages for a user. FIG. 9 shows an example of operation panel 500 having the message display window 502 displaying news about John F. Kennedy Jr. while displaying information regarding the faxing of a document by the application unit. The message displayed may be any message of interest to a user (e.g., news, advertising), and the message display window 502 may or may not display a message indicating the status of a task (or tasks) in progress (e.g., faxing, copying, printing, microwaving) additionally to the message of interest to the user. The message of interest to a user may also be displayed while the application unit is idle, for example, while the application is waiting for a new task request. The message of interest to the user may be displayed during execution of a task which requires minimal time, or it may be displayed only during the execution of tasks which require more than a predetermined amount of time, for example, thirty seconds. Any display window that is capable of displaying characters of a few words can serve as the message display window 502. Alternatively, the message may be scrolled across the message display window horizontally or vertically to allow for messages having a length longer than the width or height of the display window 502. The operation panel 500 may be any device having a character display capability.

Figure 10:
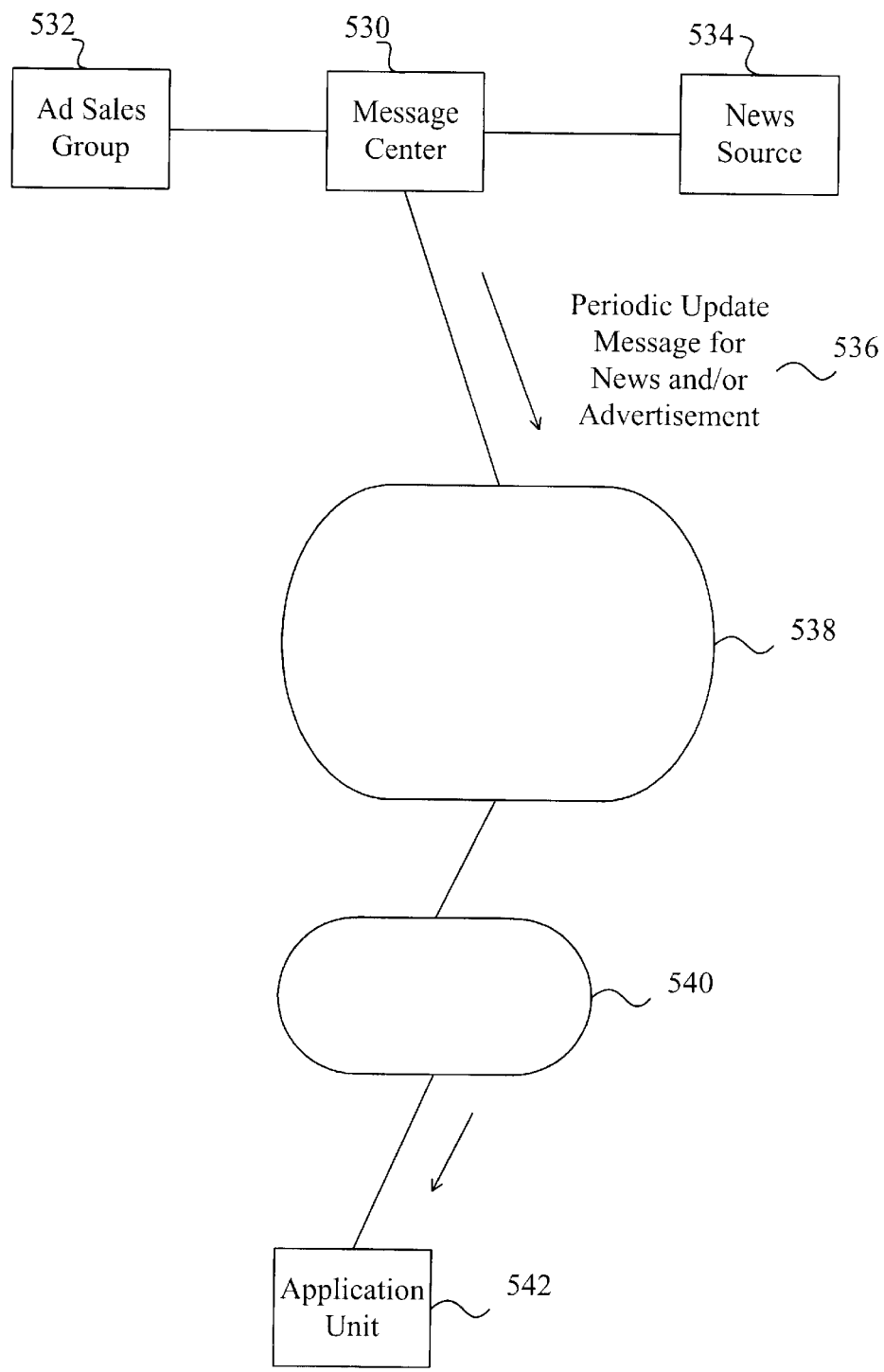
FIG. 10 illustrates an exemplary network with a message center sending messages for display to the application unit.

FIG. 10 illustrates an exemplary network having a message center 530 which sends messages for display to an application unit 542. An ad sales group 532 sends advertising messages for display on the application unit 542 to the message center 530, which may correspond to the service machine 254 discussed previously with regard to FIG. 5. A news source 534 of FIG. 10 also sends current news messages to the message center 530. The message center 530 then transmits a periodic update message for news and/or an advertisement message 536 to a network 538, which may be a WAN such as the internet (such as 10 of FIG. 5), and then on to an intranet 540, such as a LAN (e.g., Intranet 284 of FIG. 5), which includes connectivity to the application unit 542. Exemplary news messages for the intranet 540 may include company news to be supplied to the application units for display.

Figure 11:
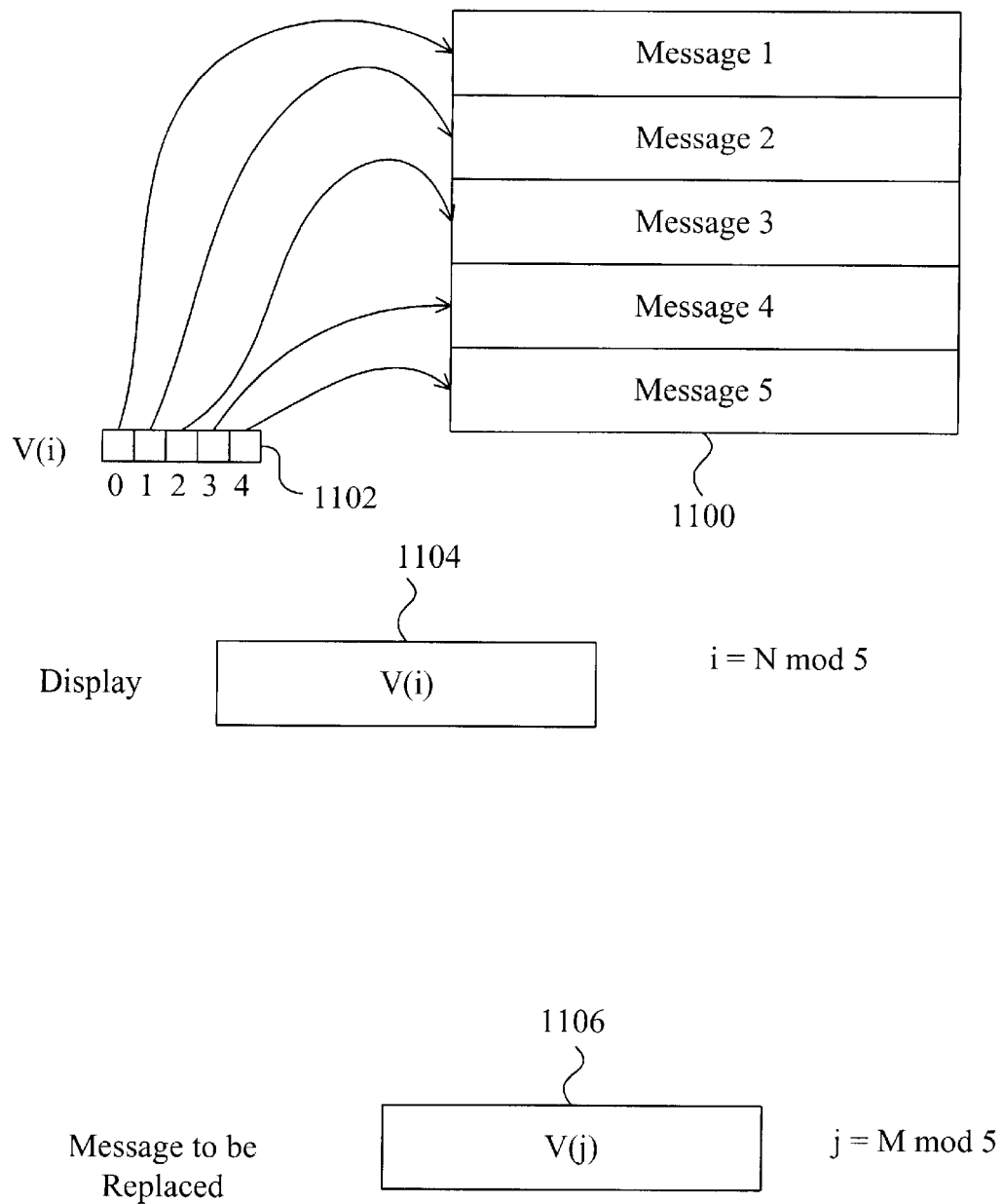
FIG. 11 is an exemplary structure inside the application unit for displaying messages.

FIG. 11 is an exemplary structure inside the application unit 542 of FIG. 10 for displaying messages. The messages that are sent to the application unit 542, for example, the periodic update message 536 of FIG. 10, are stored in a memory area 1100. A plurality of messages may occupy consecutive memory locations of fixed length. An address, or pointer to, the head of each message's memory location is stored in a message pointer vector 1102. For example, the head of message 1's memory location is stored in message pointer V(0), and the head of message 5's memory location is stored in V(4). The message to be displayed is stored in the memory location referenced by V(i) 1104, where i takes values of 0, 1, 2, 3, and 4. If a request is made to display an Nth message, then the message displayed will be the message referenced by V(N mod 5). If a circular queue technique is used, N will be incremented each time a message is displayed so that all messages in the memory area 1100 will be displayed consecutively, beginning with message 1 through message 5, followed by message 1 again.

In periodic updating of messages, it may be desired that a most recent message (e.g., news item just announced, new product or service just announced) may replace, for example, the oldest message in the memory area 1100. The message to be replaced is stored in the memory location referenced by V(j) 1106 where j takes value of 0, 1, 2, 3, and 4. Thus, if it is desired to replace an Mth message, then the message replaced will be the message referenced by V(M mod 5). If a circular queue technique is used, M will be incremented each time a new message is inserted into the memory area 1100. For this example, it was assumed that the memory area 1100 only accommodates 5 messages. However, if the memory area 1100 may accommodate k messages, then mod 5 must be replaced with mod k.

Figure 12:
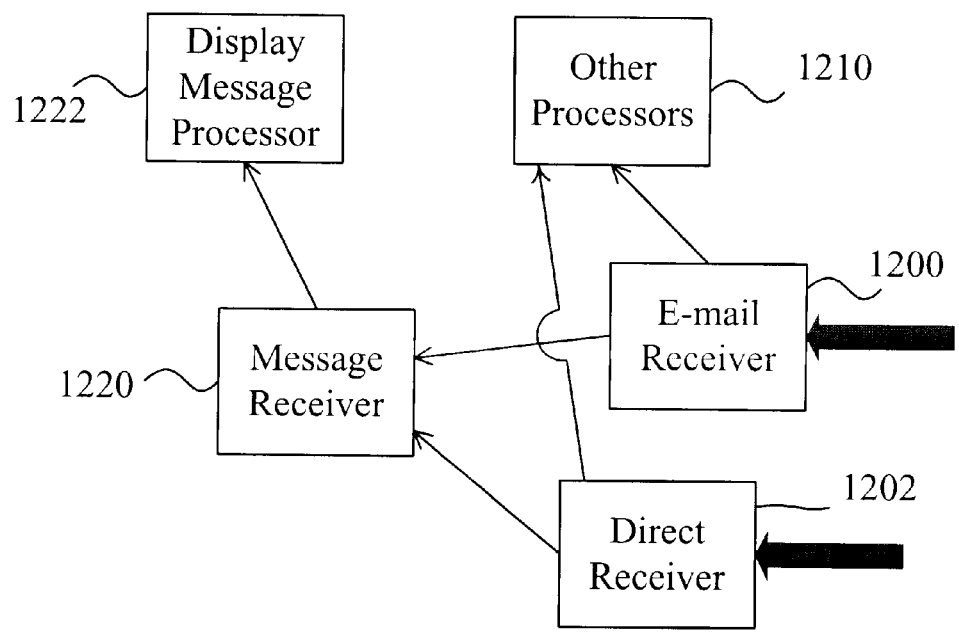
FIG. 12 illustrates an exemplary internal structure of an application unit for displaying a message.

FIG. 12 illustrates an exemplary internal structure of an application unit for displaying a message when commands are received from outside the application unit, for example, by an e-mail receiver 1200 or by a direct connection with the sender through the network or other direct channel 1202. Once the receiver 1200 or 1202 receives instructions from outside the application unit, instructions are parsed and commands are identified. According to the identified commands, an appropriate processor is called. A block of other processors 1210 is a collection of processors for performing the identified commands. For example, if the command is to update the message for display, a message receiver 1220 is called with the message. The message receiver 1220 in turn calls an updateMessage function of a display message processor 1222 with the message. The updateMessage function replaces the message in the memory location referenced by V(j) 1106 of FIG. 11 with the received message and increments the value of j by calculating j=j+1 mod 5 (or m). If other processors are needed, the appropriate processor(s) in the block 1210 of FIG. 12 is called.

Figure 13:
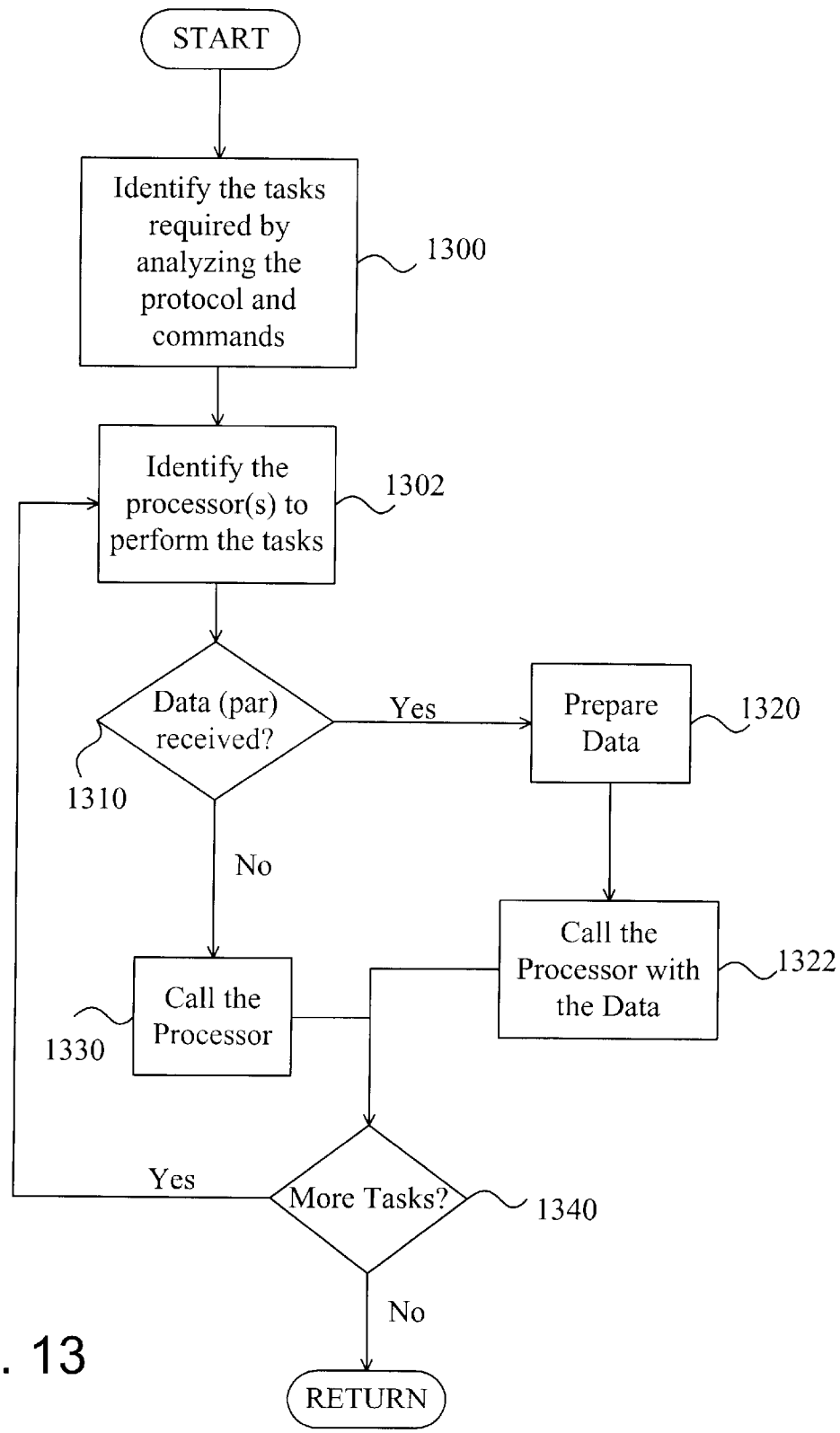
FIG. 13 is a flowchart of exemplary logic for processing received instructions in a e-mail receiver or a direct receiver.

FIG. 13 is a flowchart of exemplary logic for processing received instructions in the e-mail receiver 1200 or the direct receiver 1202 of FIG. 12. After starting, step 1300 analyzes and parses the incoming instructions to extract the commands after determining the correct protocol. In this manner, the system identifies the tasks requested by the incoming instructions. Step 1302 identifies the processors to perform the tasks. Step 1310 determines whether the data, for example parameters, are received to perform the tasks. If step 1310 determines that the data have been received, step 1320 extracts and prepares the data that are extracted. Step 1322 then calls the identified processor with the prepared parameters, and control passes to step 1340, which is discussed below. Examples of the data needed may be a parameter to update the messages to be displayed or a parameter to change the density. If step 1310 determines that the data are not received for calling a processor, step 1330 calls the processor. Step 1340 determines whether there are more tasks. If step 1340 determines that there are more tasks, control is passed back to step 1302; otherwise, control is returned to the calling process.

Figure 14:
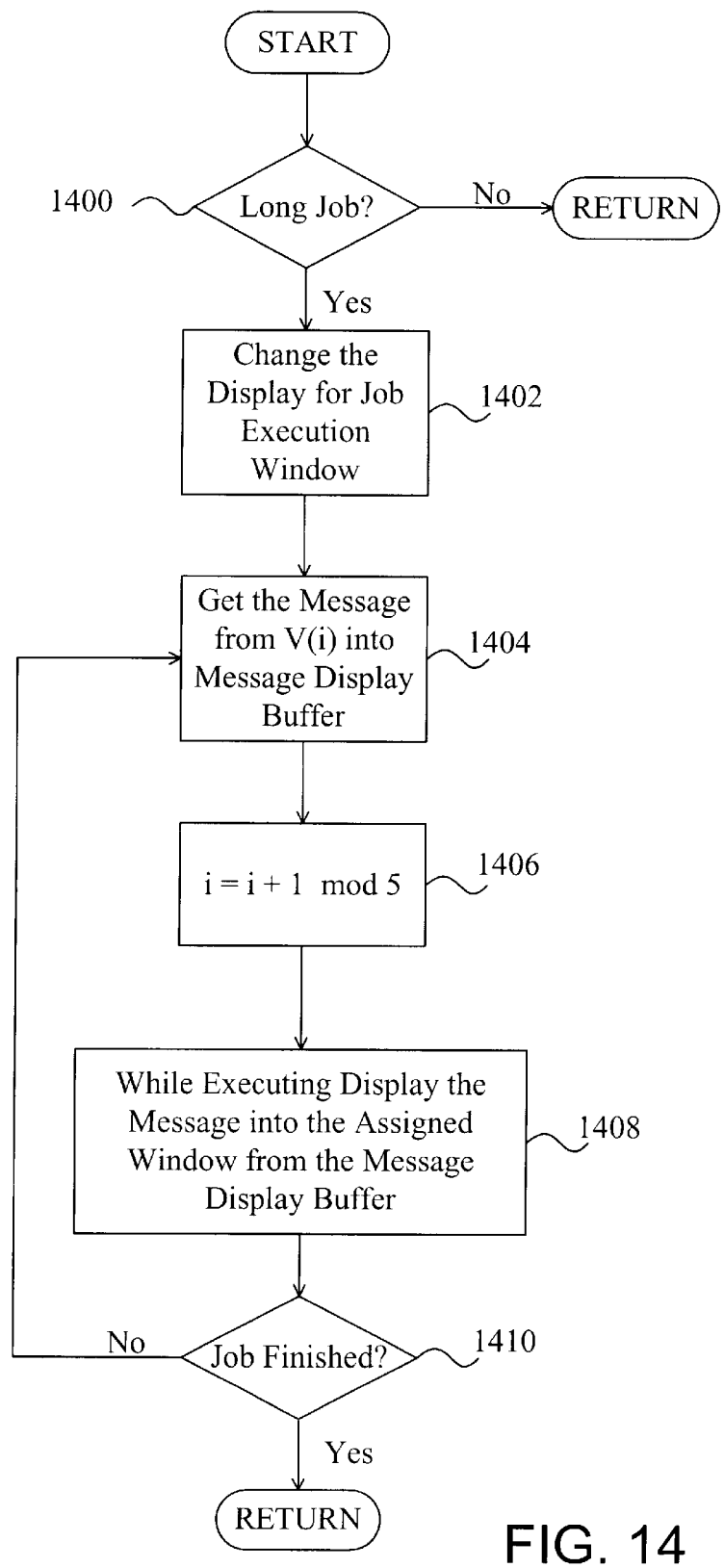
FIG. 14 is a flowchart of exemplary logic for displaying the message.

FIG. 14 is a flowchart of exemplary logic for displaying a message on the message display window 502 of FIG. 9. After starting, step 1400 of FIG. 14 determines whether a task requested of the application unit requires at least a certain predetermined amount of time to complete (e.g., thirty seconds, two minutes). If step 1400 determines that the task does not require at least the predetermined amount of time, no message is displayed. If step 1400 determines that the task does require at least the predetermined amount of time, step 1402 reconfigures the message display window 502 of FIG. 9 for displaying the message. Step 1404 copies the message stored in the memory location referenced by V(i) 1104 of FIG. 11 into a message display buffer. Step 1406 of FIG. 14 sets the value of i to i=i+1 mod 5 (or m), as discussed previously with regard to FIG. 11. Step 1408 of FIG. 14 displays the message from the message display buffer into the message display window 502 of FIG. 9 while the application unit is performing the task. Step 1410 of FIG. 14 determines whether the message has been displayed and whether the task is completed. If step 1410 determines that the message has been displayed but the task is not completed, control passes back to step 1404, which was discussed previously; otherwise, control is returned to the calling process. Thus, each message is displayed in sequence while the application is performing the requested task. Alternatively, the messages may be displayed continuously or periodically while the application unit is in an idle state, or waiting for a task to be requested.

With the above-discussed operations, the present invention provides a transfer operation for transferring a message for display from, for example, a message center to an application unit. Further, such operations of the present invention allow messages for display to be stored and to be transmitted, at appropriately selected times, by a "store-and-forward" protocol (e.g., Internet mail) or by a direct connection. Internet mail is a convenient source of such a transmission because such a transmission of messages for display may not be critically time sensitive information. Further, utilizing an Internet mail system to communicate such data can significantly reduce costs of the transmission. This invention further allows an application unit to display messages of interest to a user during times in which the user may otherwise have nothing to do other than stand or sit idly by the application unit waiting for a requested task to be completed.

This invention thus allows a supplier of the application unit to add additional services to expand business while performing basic functions such as copying or faxing. This invention may be extended to any application unit that performs tasks requiring a significant amount of time such as microwave ovens. Alternatively, application software running on a desktop computer may be used to display messages such as news or advertisement messages of new products while performing tasks or initializing the application software.

In its preferred implementation, the present invention utilizes computers having separate housings than the device to which they are attached. This allows the invention to be inexpensively implemented for installations which already have an existing computer for performing the desired processing, thus the new hardware costs may be reduced. Such an arrangement may also permit implementation of the invention without hardware changes to the device. However, if desired, the present invention may be implemented by including the appropriate processing and data storage capabilities in the device which is being monitored and/or controlled in addition to or as an alternative to a separate computer connected to the device.

This application relates to and builds on various concepts which have been disclosed in the cross-referenced patents and patent applications which have been incorporated into this application by reference. This patent application is intended to include not only the inventions disclosed in the related applications, but also the combinations of various features and functions of the individual embodiments which have been disclosed in this and each of the related applications. Thus, a feature disclosed in one of the related applications or patents may be readily applied a concept disclosed in this invention, and also, the concepts disclosed in one or more of the other applications may be applied concepts or features disclosed in other(s) of the applications. Further, an e-mail message may be used for only sending, with communication in the other direction being performed using a different mode of communication, such as one of the other communication modes disclosed herein, or a communication mode disclosed in the related patents and patent applications.

This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, any type of disk including floppy disks, optical discs, CD-ROMS, and magneto-optical disks, ROMs, RAMs, EPROMS, EEPROMS, magnetic or optical cards, or any type of media suitable for storing electronic instructions.

Stored on any one or on a combination of computer readable media, the present invention includes software for controlling both the hardware of a computer and for enabling the computer to interact with a human user. Such software may include, but is not limited to, device drivers, operating systems, development tools, and user applications. Such computer readable media further includes the computer program product of the present invention displaying various messages while performing tasks or while idling. The computer code devices of the present invention can be any interpreted or executable code mechanism, including but not limited to scripts, interpreters, dynamic link libraries, Java classes, and complete executable programs.

Obviously, numerous additional modifications and variations of the present invention are possible in light of the above teachings. It is therefore to be understood that within the scope of the appended claims, the present invention may be practiced otherwise than as specifically described herein.

What is claimed as new and desired to be secured by Letters Patent of the United States is:

1. A method, comprising:
   transferring a message for display from a first device to an application unit;
   storing, by the application unit, the message for display in a storage area;
   determining, by the application unit, one of (1) whether a requested task requires more than a predetermined amount of time for completion, and (2) whether the application unit is in an idle state; and
   transferring, by the application unit, the message for display from said storage area to a display device when the determining step determines that the requested task requires more than the predetermined amount of time for completion, or that the application unit is in an idle state,
   wherein the message for displaying is transferred to the application unit from the first device automatically, and not in response to a request by the application unit.

2. The method according to claim 1, wherein the step of transferring the message from the first device further comprises:
   transferring the message for display from the first device to the application unit using at least one of a direct connection message, a network mail message, and an electronic mail message.

3. The method according to claim 1, wherein the application unit comprises one of
   a digital image forming apparatus,
   a facsimile machine,
   a digital copier,
   a digital camera,
   a microwave oven,
   a VCR,
   an analog copier,
   a scanner,
   a printer,
   a facsimile server,
   a television,
   a refrigerator,
   a cellular telephone,
   a metering system including a gas, water, or electricity metering system,
   a household appliance,
   a vending machine, and
   an automobile.

4. The method according to claim 1, wherein the first device is connected to a first network and the application unit is connected to a second network.

5. The method according to claim 4, wherein the first and second networks are connected by a third network.

6. The method of claim 1, wherein said message is unrelated to a status of an operational status of the application unit.

7. The method of claim 1, wherein the application unit comprises an image-forming apparatus communicatively coupled to a network.

8. A system, comprising:
   a first device; and
   an application unit configured to store a message for display in a storage area, to determine one of (1) whether a requested task requires more than a predetermined amount of time for completion, and (2) whether the application unit is in an idle state, and to transfer said message for display from said storage area to a display device when the requested task requires more than the predetermined amount of time for completion, or when the application unit is in an idle state, wherein said first device is configured to transfer said message for display to said application unit automatically, and not in response to a request by said application unit.

9. The system according to claim 8, wherein the first device is configured to transfer a message for display from the first device to the application unit using at least one of a direct connection message, a network mail message, and an electronic mail message.

10. The system according to claim 8, wherein the application unit comprises one of
    a digital image forming apparatus,
    a facsimile machine,
    a digital copier,
    a digital camera,
    a microwave oven,
    a VCR,
    an analog copier,
    a scanner,
    a printer,
    a facsimile server,
    a television,
    a refrigerator,
    a cellular telephone,
    a metering system including a gas, water, or electricity metering system,
    a household appliance,
    a vending machine, and
    an automobile.

11. The system according to claim 8, wherein the first device is connected to a first network and the application unit is connected to a second network.

12. The system according to claim 11, wherein the first and second networks are connected by a third network.

13. The system of claim 8, wherein the application unit is configured to display a message that is unrelated to an operational status of the application unit.

14. The system of claim 8, wherein the application unit comprises an image-forming apparatus communicatively coupled to a network.

15. A program product including a computer readable medium embodying program instructions for causing a system to perform the steps of:
    transferring a message for display from a first device to an application unit;

storing, by the application unit, the message for display in a storage area;

determining, by the application unit, one of (1) whether a requested task requires more than a predetermined amount of time for completion, and (2) or whether the application unit is in an idle state; and transferring, by the application unit, the message for display from said storage area to a display device when the step of determining determines that the requested task requires more than the predetermined amount of time for completion, or that the application unit is in an idle state, wherein the message for displaying is transferred to the application unit from the first device automatically, and not in response to a request by the application unit.

16. The program product according to claim 15, wherein the step of transferring the message from the first device further comprises:

transferring the message for display from the first device to the application unit using at least one of a direct connection message, a network mail message, and an electronic mail message.

17. The program product according to claim 15, wherein the application unit comprises one of a digital image forming apparatus, a facsimile machine, a digital copier, a digital camera, a microwave oven, a VCR, an analog copier, a scanner, a printer, a facsimile server, a television, a refrigerator, a cellular telephone, a metering system including a gas, water, or electricity metering system, a household appliance, a vending machine, and an automobile.

18. The program product according to claim 15, wherein the first device is connected to a first network and the application unit is connected to a second network.

19. The program product according to claim 18, wherein the first and second networks are connected by a third network.

20. The program product of claim 15, wherein said message is unrelated to a status of an operational status of the application unit.

21. The program product of claim 15, wherein said application unit comprises an image-forming apparatus communicatively coupled to a network.

* * * * *